United States Patent
Fischer et al.

(10) Patent No.: US 11,184,690 B2
(45) Date of Patent: Nov. 23, 2021

(54) EMBEDDED SYSTEM FOR VIBRATION DETECTION AND ANALYSIS

(71) Applicant: ITT Manufacturing Enterprises LLC, Wilmington, DE (US)

(72) Inventors: Brian Fischer, Pasadena, CA (US); Stephen A. McIntyre, Santa Clarita, CA (US); Robert D. Matusek, Brecksville, OH (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 16/213,530

(22) Filed: Dec. 7, 2018

(65) Prior Publication Data

US 2020/0186898 A1 Jun. 11, 2020

(51) Int. Cl.
*H04Q 9/00* (2006.01)
*H04L 29/08* (2006.01)
(Continued)

(52) U.S. Cl.
CPC .............. *H04Q 9/00* (2013.01); *G01H 1/00* (2013.01); *G01P 15/0802* (2013.01);
(Continued)

(58) Field of Classification Search
CPC ........ H04Q 9/00; G01H 1/00; G01P 15/0802; H04L 69/324; H04L 12/40013; H04L 2012/40215
See application file for complete search history.

(56) References Cited

U.S. PATENT DOCUMENTS 6,208,944 B1 * 3/2001 Franke .................. G01H 1/003
340/680
2011/0252577 A1 * 10/2011 Kim ...................... D06F 37/203
8/137
(Continued)

FOREIGN PATENT DOCUMENTS

CN 104458170 A 3/2015
CN 106644035 A 5/2017
(Continued)

OTHER PUBLICATIONS

Vigor Technology, "FFT Inclinometer", http://www.imajteknik.net/uploads/fft-inclinometer.pdf, Accessed on Dec. 7, 2018, pp. 126-130.
(Continued)

*Primary Examiner* — Amine Benlagsir
(74) *Attorney, Agent, or Firm* — Scully, Scott, Murphy & Presser, P.C.

(57) ABSTRACT

A sensor device may transform sensor data into spectrum data to be processed by a computer device. In an example, the sensor device may detect acceleration forces caused by a vibration. The sensor device may transform the acceleration forces into sensor data. The sensor device may transform the sensor data into spectrum data. The sensor device may execute a spectrum analysis on the spectrum data. The sensor device may generate a packet that includes a result of the spectrum analysis as a payload of the packet. A format of the packet may be based on a protocol of a communication link between the sensor device and the computer device. The sensor device may send the packet to the computer device through the communication link.

20 Claims, 3 Drawing Sheets

(51) Int. Cl.
  *G01H 1/00* (2006.01)
  *G01P 15/08* (2006.01)
  *H04L 12/40* (2006.01)

(52) U.S. Cl.
  CPC ...... *H04L 69/324* (2013.01); *H04L 12/40013* (2013.01); *H04L 2012/40215* (2013.01)

(56) References Cited

U.S. PATENT DOCUMENTS

| | | | | |
|---|---|---|---|---|
| 2013/0006551 A1* | 1/2013 | Sako | ................ | G01H 1/14 702/56 |
| 2015/0073742 A1* | 3/2015 | Bach | ................ | G01D 21/00 702/121 |
| 2015/0276522 A1* | 10/2015 | Miyata | ................ | G01H 13/00 73/862.41 |
| 2016/0103012 A1* | 4/2016 | Liu | ................ | F04D 27/02 702/33 |
| 2017/0176244 A1* | 6/2017 | Fujita | ................ | G01M 7/022 |
| 2017/0356364 A1* | 12/2017 | Glugla | ................ | F01L 1/181 |
| 2018/0163644 A1* | 6/2018 | Kim | ................ | F02P 5/152 |
| 2018/0202679 A1* | 7/2018 | Berg | ................ | G01M 99/008 |
| 2018/0225892 A1* | 8/2018 | Miura | ................ | B60K 31/0058 |
| 2018/0227649 A1* | 8/2018 | Corbin | ................ | H04Q 9/00 |
| 2018/0231090 A1* | 8/2018 | Gnerlich | ................ | G01C 19/5726 |

FOREIGN PATENT DOCUMENTS

| | | |
|---|---|---|
| CN | 207964226 U | 10/2018 |
| JP | 2013122399 A | 6/2013 |
| WO | 2018119489 A1 | 7/2018 |

OTHER PUBLICATIONS

Analog Devices, "Digital Triaxial Vibration Sensor with FFT Analysis and Storage", ADIS16228 Data Sheet, https://www.analog.com/media/en/technical-documentation/data-sheets/adis16228.pdf, Accessed on Dec. 7, 2018, pp. 1-29, Rev. F.

International Search Report dated Mar. 26, 2020 received in PCT/US2019/064821, 10 pages.

\* cited by examiner

EMBEDDED SYSTEM FOR VIBRATION DETECTION AND ANALYSIS

BACKGROUND

Unless otherwise indicated herein, the materials described in this section are not prior art to the claims in this application and are not admitted to be prior art by inclusion in this section.

In an example, sensors such as accelerometers may detect and collect raw data indicating acceleration forces caused by a vibration. The collected raw data may be converted into electrical signals. Analysis may be performed in a time domain representation of the electrical signals to analyze changes of the vibration over time. Analysis may also be performed in a frequency domain representation of the electrical signals to analyze different frequencies of the vibration. One or more devices may be employed to perform the analysis on the electrical signals in the time domain and in the frequency domain.

SUMMARY

In some examples, a method of transforming sensor data into frequency spectrum data to be processed by a computer device is generally described. The method may include detecting, by a sensor device, acceleration forces caused by a vibration. The method may further include transforming, by the sensor device, the acceleration forces into sensor data represented in a time domain. The method may further include transforming, by the sensor device, the sensor data into spectrum data represented in a frequency domain. The method may further include executing, by the sensor device, spectrum analysis on the spectrum data. The method may further include generating, by the sensor device, a packet that comprises a result of the spectrum analysis as a payload of the packet. A format of the packet may be based on a protocol of a communication link between the sensor device and the computer device. The method may further include sending, by the sensor device, the packet to the computer device through the communication link.

In some examples, a system effective to transform sensor data into frequency spectrum data to be processed by a computer device is generally described. The system may include a computer device, a sensor device, and a communication link between the computer device and the sensor device. The sensor device may be configured to be in communication with the computer device. The sensor device may be configured to detect acceleration forces caused by a vibration. The sensor device may be further configured to transform the acceleration forces into sensor data represented in a time domain. The sensor device may be further configured to transform the sensor data into spectrum data represented in a frequency domain. The sensor device may be further configured to execute a spectrum analysis on the spectrum data. The sensor device may be further configured to generate a packet that comprises a result of the spectrum analysis as a payload of the packet. A format of the packet may be based on a protocol of the communication link. The sensor device may be further configured to send the packet to the computer device through the communication link.

In some examples, a device configured to transform sensor data into frequency spectrum data to be processed by a computer device is generally described. The device may include an accelerometer, a memory device, and a processor. The processor may be configured to be in communication with the accelerometer and the memory device. The accelerometer may be configured to detect acceleration forces caused by a vibration. The accelerometer may be further configured to transform the acceleration forces of the vibration into sensor data represented in a time domain. The accelerometer may be further configured to send the sensor data to the processor. The processor may be configured to transform the sensor data into spectrum data represented in a frequency domain. The processor may be further configured to execute a spectrum analysis on the spectrum data. The processor may be further configured to generate a packet that comprises a result of the spectrum analysis as a payload of the packet. A format of the packet may be based on a protocol of a communication link between the device and the computer device. The processor may be further configured to send the packet to the computer device through the serial port and the communication link.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

In an example, analysis of raw data (e.g., sensor measurements) collected by one or more sensors may be performed by one or more different devices. By employing different devices to perform the analysis on the raw data, the workload of the analysis may be distributed to the different devices. The distribution of the workload may allow the different devices to perform the analysis on behalf of the particular computer device. In some examples, the distribution of the workload may allow the different devices to perform the analysis on behalf of a particular computer device that may lack particular functionalities or components to perform the analysis. Furthermore, using different devices to perform the analysis on behalf of the particular computer device may reduce the need to modify the particular computer device.

To be described in more detail below, a system 100 in accordance with the present disclosure may include one or more sensor devices configured to perform analysis of raw data collected by one or more sensors. The sensor devices in accordance with the present disclosure may transmit results of the analysis to a computer system or device of a machine (e.g., aircraft, rotorcraft, and/or other types of machines). Thus, the system 100 provides a network of sensor devices that may perform analysis of raw data on behalf of the computer system of the machine. For example, the sensor devices of system 100 may perform Fast Fourier Transform (FFT) analysis on raw data associated with a vibration, where a result of the FFT analysis may profile the vibration. The sensor devices may transmit the result of the FFT analysis to the computer system of the machine, where the result may be used by the computer system of the machine to operate the machine.

Figure 1:
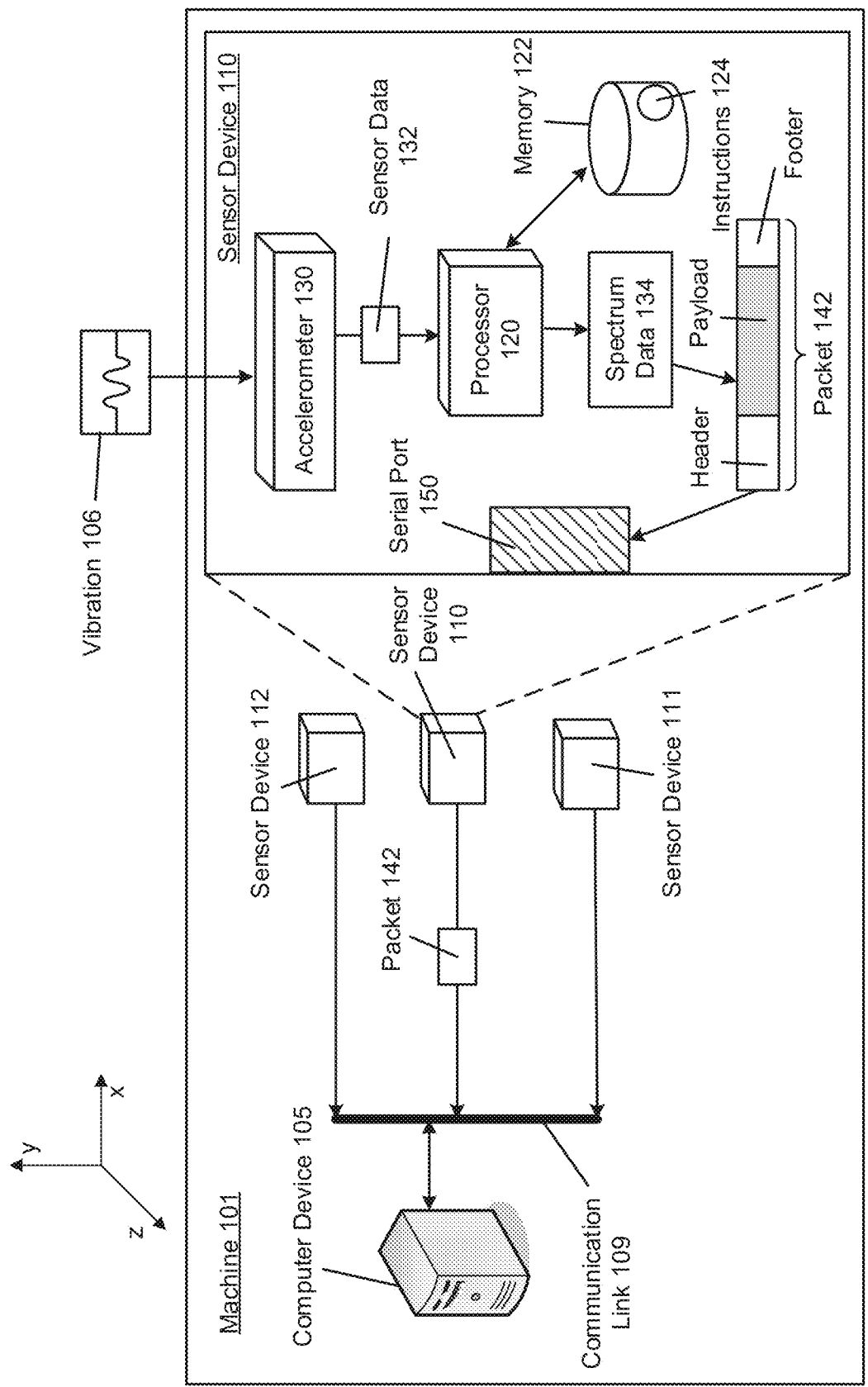
FIG. 1 illustrates an example system that may implement an embedded system for vibration detection and analysis, in one embodiment.

FIG. 1 illustrates an example system that may implement an embedded system for vibration detection and analysis, arranged in accordance with at least some embodiments presented herein. System 100 may be implemented on a machine 101, where machine 101 may be an aircraft, a rotorcraft, or a machine, that includes a computer device 105. In an example, computer device 105 may be a legacy device that may be deemed as outdated, or may lack particular capabilities such as processing power, speed, memory capacity, computational functionalities, and/or other capabilities. In an example, computer device 105 may be a master control unit (MCU) of a rotorcraft (e.g. machine 101). System 100 may include computer device 105 and one or more sensor devices, such as sensor devices 110, 111, 112. Sensor devices 110, 111, 112 may be configured to be in communication with computer device 105 through a communication connection or communication link, such as a communication link 109. Sensor devices 110, 111, 112 may each be an individual embedded system comprising sensing and processing components embedded on the same printed circuit board. Some examples of sensing components may include sensors operable to detect motion and/or vibrations, such as an accelerometer. Some examples of processing components may include microprocessors, microcontrollers, and/or other types of processing components or elements. Communication link 109 may be a standardized communication connection, link or bus (e.g., communication bus that may be used to transmit packets of a specific format). For example, a protocol of communication link 109 may be an industry standard communication protocol, such as a controller area network (CAN) bus, Ethernet, RS-232, or a RS-485 bus, and/or other standardized serial communication bus. Sensor devices 110, 111, 112 may be located at different locations of machine 101. For example, if machine 101 is a rotorcraft, sensor devices 110, 111, 112, and/or additional sensor devices may be located, for example, in proximity to a seat of a pilot, in the cockpit, in proximity to an engine, along a tail of the rotorcraft, in proximity to the tail rotor, and/or other locations on the rotorcraft.

Each sensor among sensor devices 110, 111, 112 may include similar components. Using sensor device 110 as an example, sensor device 110 may include a processor 120, a memory 122, an accelerometer 130, and/or a serial port 150, where processor 120 may be a microprocessor. Memory 122 may be configured to store a set of instructions 124, where instructions 124 may be a set of executable instruction including executable code. Instructions 124 may be executed by processor 120. Instructions 124 may be associated with vibration analysis such as Discrete Time Fourier Transform (DTFT), Fast Fourier Transform (FFT) algorithms, magnitude and phase spectrum analysis techniques, filtering or windowing techniques, and/or other algorithms and techniques relating to time domain analysis and/or frequency domain analysis. Serial port 150 may be a serial communication interface effective to transmit data into, or out of, sensor device 110 serially (e.g., one bit at a time). Memory 122 may be further configured to store serial bus communication protocols of communication link 109, including a format of packets that may be transmitted using communication link 109. Accelerometer 130 may be a device configured to detect acceleration forces caused by vibrations being experienced by machine 101, or a portion of machine 101. In some examples, the accelerometer 130 may be configured to detect acceleration forces caused by vibrations in real-time, such as vibrations being experienced by machine 101 during an operation of machine 101. In some examples, sensor device 110 may be housed in a mountable enclosure with a pigtail harness connected to a connector that facilitates power transmission and serial communication through serial port 150. In some examples, sensor device 110 may further include regulators configured to accept a variety of alternating current (AC) or direct current (DC) input power signals.

In an example, machine 101 may experience a vibration 106, where vibration 106 may cause machine 101 to experience acceleration forces in one or more directions, such as directions in a three-dimensional Cartesian coordinate system (e.g., x, y, z directions). In some examples, accelerometer 130 may be a triple-axes accelerometer configured to detect acceleration forces in three directions (e.g., x, y, z directions). In an example, accelerometer 130 may be a micro electromechanical system (MEMS) including components such as cantilever beam with a seismic mass. Accelerometer 130 may be configured to detect the acceleration forces caused by vibration 106 by detecting motion of the components of accelerometer caused by the acceleration forces. Accelerometer 130 may transform the detected acceleration forces, or detected motion, into electrical signals represented as sensor data 132, where sensor data 132 may include data represented in a time domain (e.g., magnitude of the signals over a range of times). Accelerometer 130 may send sensor data 132 to processor 120.

Processor 120 may receive sensor data 132 and may execute FFT algorithms among instructions 124 to transform sensor data 132 into spectrum data 134, where spectrum data 134 may include data in a frequency domain. For example, sensor data 132 may include data representing magnitude of the signals of vibration 106 over a range of times, and spectrum data 134 transformed from sensor data 132 may include data representing magnitudes of the signals of vibration 106 over a range of frequencies. In some examples, processor 120 may also execute FFT algorithms to transform sensor data 132 into spectrum data that represents other attributes of vibration 106, such as a phase spectrum that may indicate a direction of vibration 106.

In an example, processor 120 may be configured to sample sensor data 132 at one or more sampling rates, transform the sampled sensor data 132 into spectrum data 134, and perform a spectrum analysis (e.g., analysis in the frequency domain) on spectrum data 134. Processor 120 may identify one or more attributes of vibration 106 based on the spectrum analysis on spectrum data 134, such as a frequency in which a maximum magnitude of vibration 106 occurs, a phase of vibration 106, and/or other attributes of vibration 106. Processor 120 may be configured to generate one or more packets, such as a packet 142, in a format specific to the serial communication protocol of communication link 109. For example, processor 120 may generate packet 142 in a format based on a protocol of a CAN bus if communication link 109 is a CAN bus.

Processor 120 may insert the results of the spectrum analysis (e.g., identified frequency corresponding to a maximum magnitude, phase of vibration 106) into a payload of packet 142. Processor 120 may transmit packet 142 to computer device 105 through serial port 150 and communication link 109. Computer device 105 may receive packet 142, and may read the results of the spectrum analysis (the payload) from packet 142. Computer device 105 may use the results of the spectrum analysis to operate machine 101. For example, computer device 105 may control various damping components of machine 101 based on the results of the spectrum analysis to counteract vibration 106 being experienced by machine 101 (further described below).

Figure 2:
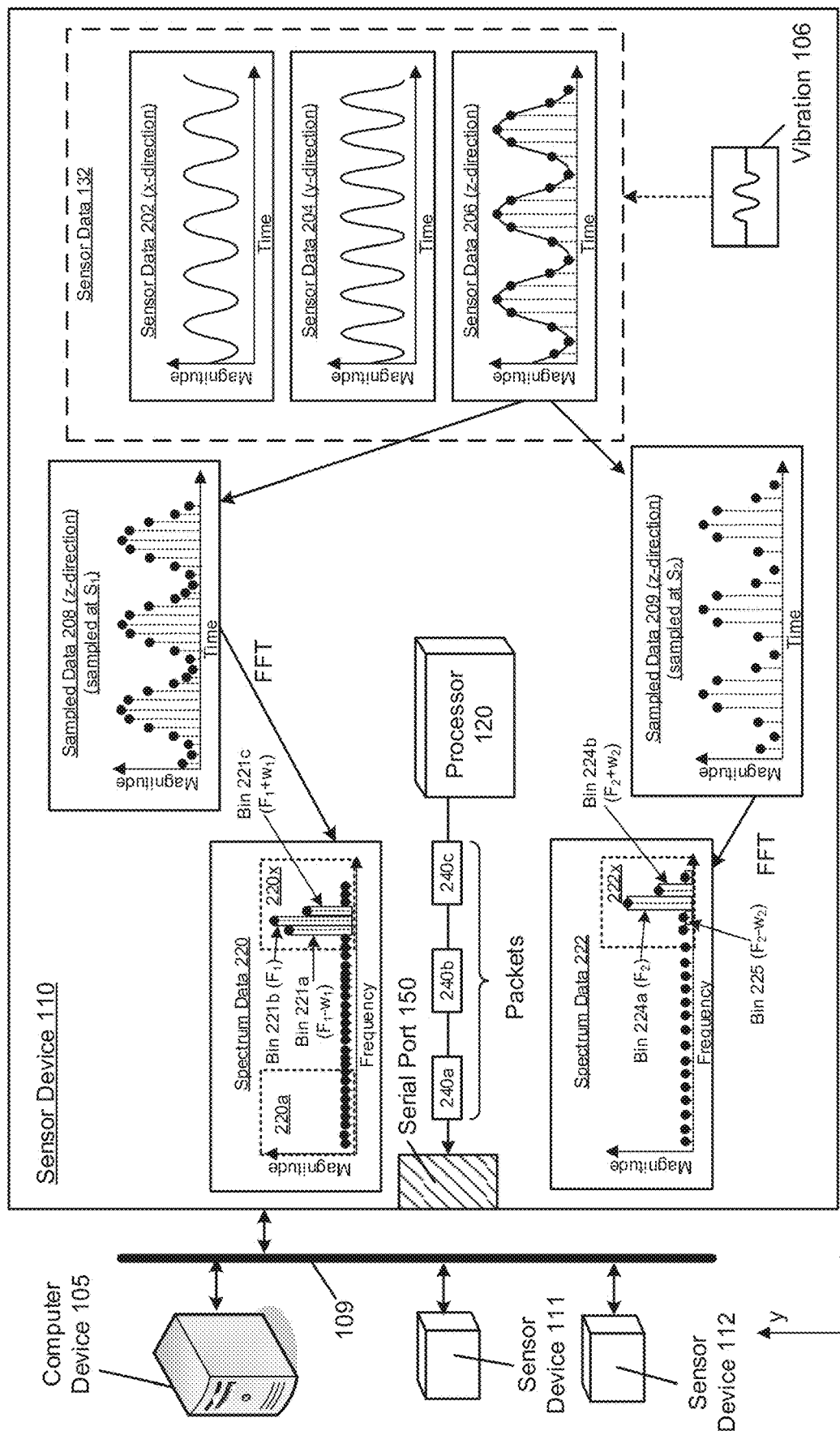
FIG. 2 illustrates an example implementation of the example system of FIG. 1, in one embodiment.

FIG. 2 illustrates an example implementation of the system 100 of FIG. 1, arranged in accordance with at least some embodiments presented herein. FIG. 2 may include components that are labeled identically to components of FIG. 1, which will not be described again for the purposes of clarity. The description of FIG. 2 may reference at least some of the components of FIG. 1.

In an example shown in FIG. 2, generation of sensor data 132 may include generation of sensor data 202, 204, 206, corresponding to acceleration forces caused by vibration 106 in x-direction, y-direction, and z-direction, respectively. Sensor data 202, 204, 206 may each include continuous-time signals. Processor 120 may be configured to sample sensor data 202, 204, 206, using one or more different sampling rates. Focusing on sensor data 206 as an example, processor 120 may sample sensor data 206 at a sampling rate $S_1$ to generate sampled data 208, and may sample sensor data 206 at a sampling rate $S_2$ to generate sampled data 209. Processor 120 may execute FFT algorithms (among instructions 124) to transform sampled data 208, 209, into spectrum data 220, 222, respectively. Spectrum data 220, 222 may each correspond to magnitudes of acceleration forces of vibration 106 over a range of frequencies. Each spectrum data (e.g., spectrum data 220, 222) may include one or more frequency bins (or bins), and each bin may correspond to a range of frequencies among the spectrum data. The bins among the spectrum data 220, 222 may be of equal width (e.g., a width being a number of frequencies). Processor 120 may be configured to execute spectrum analysis on spectrum data 220, 222.

Each sampled data 208, 209, may include a number of points sampled from sensor 106 at sampling rates $S_1$, $S_2$, respectively. Different sampling rates may result in processor 120 sampling sensor data 206 at different time intervals, and may result in different number of points being generated for each piece of sampled data. The time interval in which sensor data 206 is sampled may correspond to a frequency interval, or a width of frequency bins, in a piece of corresponding spectrum data. For example, spectrum data 220, 222 may each correspond to a range of frequencies, such as, from 0 Hertz (Hz) to 1024 Hz. In the example shown in FIG. 2, sampling rate $S_2$ may be greater than sampling rate $S_1$, such that sampled data 208 may include more points than sampled data 209. Further, due to sampling rate $S_2$ being greater than sampling rate $S_1$, a time interval between points in sampled data 208 may be less than the time interval between points in sampled data 209. Furthermore, due to sampling rate $S_2$ being greater than sampling rate $S_1$, a width of each bin among spectrum data 222 may be greater than a width of each bin among spectrum data 220. For example, $S_1$ may be 4096 Hz and $S_2$ may be 8192 Hz. If a FFT size (e.g., a desired number of frequency bins) is 1024, then a width of each bin among spectrum data 220 is 4 Hz (4096 Hz/1024), and a width of each bin among spectrum data 222 is 8 Hz (8192 Hz/1024).

Thus, processor 120 may adjust a frequency resolution of spectrum data resulting from an application of FFT. In some examples, the sampling rate used by processor 120 to sample sensor data 206 may be application specific, such as being based on a frequency spectrum window and a bin resolution associated with different applications. In an example, the sampling rate defines the frequency spectrum window (e.g., a range of frequencies) to be monitored in a spectrum analysis. Thus, a relatively lower sampling rate may limit a range of frequencies being monitored, but may also increase the bin resolution. For example, if processor 120 samples sensor data 206 using $S_1$ and $S_2$, at a fixed FFT size (e.g., a desired number of bins), the range of frequencies in spectrum data 220 may be half the range of frequencies in spectrum data 222. In some examples, using a relatively low sampling rate may lead to sampling sensor data 206 for a longer period of time, which may decrease a response time for processor 120 to complete the transformation of sensor data 206 into spectrum data. For example, if a range of times or frequencies to be analyzed by processor 120 is fixed, processor 120 may need to use more time to transform sampled data 208 into spectrum data 220 when compared to transformation of sampled data 209 into spectrum data 222 (due to sampled data 208 including more points). In an example, a vibration damping component of machine 101 may be implemented to focus on attenuation of vibrations at a relatively low range of frequencies, such as 20 hz to 30 hz. Therefore, processor 120 may sample sensor data 206 at a relatively low rate to improve the bin resolution the frequency range 20 hz to 30 hz. Further a FFT size may impact the range of frequencies defined by the frequency spectrum window.

In the example shown in FIG. 2, the width of bins among spectrum data 220 is less than the width of bins among spectrum data 222. The difference between the frequency resolutions of spectrum data 220 and spectrum data 222 may be shown by a section 220x of spectrum data 220 and a section 222x of spectrum data 222. Section 220x includes a presence of three bins (bins 221*a*, 221*b*, 221*c*) representing magnitudes of vibration 106 at frequencies $F_1-w_1$, $F_1$, $F_1+w_1$ in spectrum data 220, respectively, where $w_1$ is a width of the bins in spectrum data 220. Section 222x includes a presence of two bins (bins 224*a*, 221*b*) representing magnitudes of vibration 106 at frequencies $F_2$, $F_2+w_2$ in spectrum data 222, respectively, where $w_2$ is a width of the bins in spectrum data 222. Thus, spectrum data 220 has a higher frequency resolution than spectrum data 222, and decreasing the sampling rate (at a fixed FFT size) may increase the frequency resolution. In another example, if a sampling rate is fixed, an increase in the FFT size would increase the frequency resolution.

In an example, processor 120 may further determine that a difference between an amplitude (magnitude) of a bin 225 corresponding to frequency $F_2-w_2$ and an amplitude of bin 224*a*, is greater than a threshold that may be defined and stored in memory 122. When the difference between bin 225 and bin 224*a* is greater than the threshold, there is an implication of a presence of frequency leak. Processor 120, in response to the difference being greater than the threshold, may sample sensor data 206 at a lower sampling rate, such as $S_1$, to obtain spectrum data of higher frequency resolution. Thus, processor 120 may be configured to sample spectrum data with different sampling rates in order to improve frequency resolution of the spectrum data and to reduce the potential risk of frequency leak during sampling in an execution of spectrum analysis. In an example, processor 120 may toggle the bin resolution during the spectrum analysis. For example, processor 120 may start with an initial sampling rate to generate spectrum data for a specific application, and may decrease the sampling rate to improve the bin resolution when required by the specific application.

Processor 120 may identify specific attributes of vibration 106 based on spectrum data 220, 222. In an example, processor 120 may identify frequency $F_1$ that corresponds to a maximum magnitude being indicated by spectrum data 220. In another example, processor 120 may determine a power spectral density of vibration 106 for each spectrum data 220, 222, where the power spectral densities may characterize random vibration signals among vibration 106. Processor 120 may determine the power spectral density by, for example, multiplying each bin among the spectrum data by its complex conjugate. Processor 120 may generate packets 240a, 240b, 240c corresponding to spectrum data transformed from sensor data 202, 204, 206, respectively. Each packet among packets 240a, 240b, 240c may include one or more attributes of vibration 106, as a payload, in a corresponding direction (e.g., x, y, z-directions). Processor 120 may send packets 240a, 240b, 240c to serial port 150, such that sensor device 110 may transmit packets 240a, 240b, 240c, sequentially, to computer device 105 through communication link 109. Thus, sensor device 110 may provide results of the spectrum analysis to computer device 105 in order for computer device 105 to operate the machine housing computer device 105 and sensor device 110 based on the results of the spectrum analysis.

In another example, spectrum data 220 may be divided or partitioned into one or more sections, such as sections 220a, 220x. Each section of spectrum data 220 may include a particular number of bins. For example, if spectrum data 220 ranges from 0 Hz to 1023 Hz, spectrum data 220 may include sixteen sections (including 220a, 220x), where each section of spectrum data 220 includes sixteen frequency bins due to sensor data 206 being sampled using sampling rate $S_1$ (each section spans a range of 64 Hz, and each bin of each section having a width of 4 Hz). Processor 120 may insert each section of spectrum data 220 into a respective packet as a payload. Thus, if spectrum data 220 includes sixteen sections, processor 120 may generate sixteen packets for spectrum data 220, each packet including a section of spectrum data 220 as a payload. The sixteen packets may be transmitted to computer device 105 through serial port 150 and communication link 109. Computer device 105 may receive the sixteen packets and may perform analysis or comparisons on the sixteen packets in order to perform particular tasks or operations relating to operations of machine 101. In some examples, partitioning spectrum data 220 into different sections may be based on a specific application of system 100. Computer device 105 may be configured to send one or more application parameters to sensor device 110, where the application parameters may be specific to the specific application. For example, a motor of machine 101 may be vulnerable to failure if vibrations of a particular range of frequencies, with particular magnitudes, are applied to the motor. Computer device 105 may send the particular range of frequencies, the particular magnitudes, data capture information and procedures, and/or other information relating to monitoring a health of the motor. Sensor device 110 may be located in proximity to the motor of machine 101 to monitor amplitudes of vibrations at the particular range of frequencies applied at locations in proximity to the motor. Processor 120 may partition spectrum data 220 into different sections, such that at least one section corresponds to the particular range of frequencies. If amplitudes of the bins within the sections corresponding to the particular range of frequencies exceed a predefined threshold, then there is a risk of damages or failures of the motor. Thus, processor 120 may generate a message indicating a health of the motor, such as messages stating "healthy" or "not healthy", and may insert the message into the payload of a packet to be transmitted to computer device 105.

In an example, computer device 105 may receive sections 220a and 220x of spectrum data 220. Computer device 105 may analyze the bins among section 220a, such as comparing the amplitudes of the bins within section 220a with each other, and may determine that amplitudes of the bins among section 220a are substantially similar (e.g., amplitude difference between each pair of bins being below a threshold value). Computer device 105 may analyze the bins among section 220x and may determine that amplitudes of bins 221a, 221b, 221c are significantly greater than amplitudes of other bins within section 220x (e.g., amplitude difference between bins 221a, 221b, 221c and other bins in section 220x being greater than a threshold value). Based on the determination that section 220x includes one or more bins with amplitudes significantly greater than other bins within section 220x, computer device 105 may identify a bin with a largest amplitude in section 220x. In the example shown in FIG. 2, computer device 105 may identify bin 221b has the largest amplitude among the amplitudes of the bins of section 220x, and frequency $F_1$ corresponds to bin 221b. Computer device 105 may identify frequency $F_1$ as a critical frequency caused by acceleration forces, in the z-direction, of vibration 106.

Computer device 105 may operate components of machine 101 based on the identified frequency $F_1$. For example, computer device 105 may be configured to adjust a position of a weight on a tuned mass damper located in or on machine 101. Each position of the weight on the tuned mass damper may attenuate a different vibration frequency. A mapping between a plurality of positions of the weight and the different vibration frequencies may be stored in a memory of machine 101. Computer device 105 may be configured to perform a lookup function on the stored mapping to identify a position of the weight that is mapped to frequency $F_1$. Computer device 105 may adjust the weight to the identified position to attenuate vibration 106.

In an example, more than one sensor devices, such as sensor devices 110, 111, 112 may communicate respective packets including spectrum analysis results to computer device 105 through communication link 109. Thus, in an example where sensor devices 110, 111, 112 are located at different locations within a machine such as a rotorcraft, each sensor device may be configured to output respective spectrum analysis results indicating vibration effects to different locations of the rotorcraft. In some examples, an order in which the sensor devices 110, 111, 112, transmit respective spectrum analysis results to computer device 105 may be based on the protocol of communication link 109. For example, if communication link 109 is a CAN bus, the order in which sensor devices 110, 111, 112 transmit data to computer device 105 may be based on an arbitration scheme of a protocol of a CAN bus. Thus, using a standardized serial communication bus may allow sensor devices 110, 111, 112, to transmit respective spectrum analysis results to computer device 105 in an organized manner. Further, the sensor devices in accordance with the present disclosure may be relocated to different locations among the machine, in order to provide a flexible network of vibration sensor devices on the machine.

Figure 3:
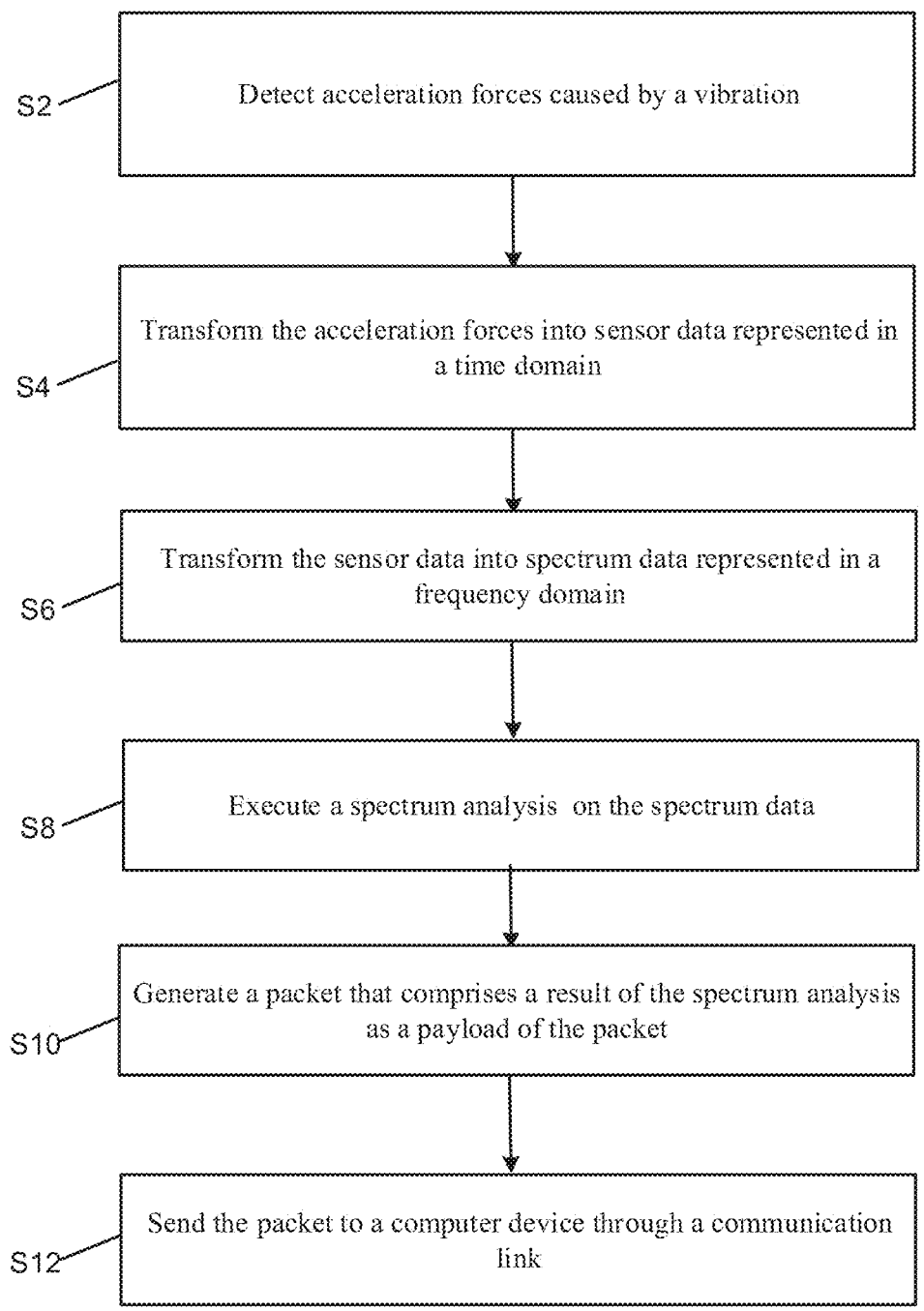
FIG. 3 illustrates a flow diagram relating to a process to implement an embedded system for vibration detection and analysis, in one embodiment.

FIG. 3 illustrates a flow diagram relating to a process to implement an adaptive tuned mass absorber, arranged in accordance with at least some embodiments presented herein. The process in FIG. 3 may be implemented using, for example, system 100 discussed above. An example process may include one or more operations, actions, or functions as illustrated by one or more of blocks S2, S4, S6, S8, S10, and/or S12. Although illustrated as discrete blocks, various blocks may be divided into additional blocks, combined into fewer blocks, eliminated, or performed in parallel, depending on the desired implementation.

The processing may begin at block S2, "Detect acceleration forces caused by a vibration". A block S2, A sensor device may detect acceleration forces caused by a vibration.

The processing continues from block S2 to block S4, "Transform the acceleration forces into sensor data represented in a time domain". At block S4, the sensor device may transform the acceleration forces into sensor data represented in a time domain.

The processing may continue from block S4 to block S6, "Transform the sensor data into spectrum data represented in a frequency domain". At block S6, The sensor device may transform the sensor data into spectrum data represented in a frequency domain.

The processing may continue from block S6 to block S8, "Execute a spectrum analysis on the spectrum data". At block S8, the sensor device may execute a spectrum analysis on the spectrum data. The execution of the spectrum analysis on the spectrum data may include sampling the spectrum data at a sampling rate. The sensor device may further adjust a frequency resolution of the spectrum data by sampling the spectrum data at a different sampling rate.

The processing may continue from block S8 to block S10, "Generate a packet that comprises a result of the spectrum analysis as a payload of the packet". At block S10, the sensor device may generate a packet that comprises a result of the spectrum analysis as a payload of the packet. A format of the packet may be based on a protocol of a communication link between the sensor device and the computer device. In some examples, the communication link may be a controller area network (CAN) bus.

The processing may continue from block S10 to block S12, "Send the packet to the computer device through a communication link". At block S12, the sensor device may send the packet to the computer device through the communication link.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for transforming data into frequency data to be processed by a computer device, the method comprising:
   detecting, by a sensor of a sensor device located on a location of a machine, acceleration forces caused by a vibration being experienced at the location of the machine;
   transforming, by a processor of the sensor device, the acceleration forces into sensor data represented in a time domain;
   transforming, by the processor of the sensor device, the sensor data represented in the time domain into spectrum data represented in a frequency domain, wherein the sensor and the processor are embedded on a same printed circuit board of the sensor device such that the sensor and the processor are located on the location of the machine;
   executing, by the processor of the sensor device, a spectrum analysis on the spectrum data;
   generating, by the processor of the sensor device, a packet that comprises a result of the spectrum analysis as a payload of the packet, wherein a format of the packet is based on a protocol of a serial communication link between the sensor device and the computer device; and
   sending, by the processor of the sensor device, the packet comprising the result of the spectrum analysis to the computer device through the serial communication link;
   identify a frequency that corresponds to a frequency bin with a lamest amplitude among the spectrum data; and
   operate a tuned mass damper based on the identified frequency.

2. The method of claim 1, wherein the serial communication link is a controller area network (CAN) bus.

3. The method of claim 1, wherein transforming the sensor data represented in the time domain into the spectrum data comprises:
   sampling, by the sensor device, the sensor data represented in the time domain at a sampling rate to generate sampled data; and
   transforming the sampled data into the spectrum data.

4. The method of claim 3, further comprising adjusting, by the sensor device, a frequency resolution of the spectrum data by sampling the sensor data represented in the time domain at a different sampling rate.

5. The method of claim 3, further comprising receiving, by the sensor device, one or more application parameters, wherein the sampling rate is based on the received one or more application parameters.

6. The method of claim 3, further comprising:
   receiving, by the sensor device, one or more application parameters;
   partitioning, by the sensor device, the spectrum data into one or more sections based on the one or more application parameters;
   generating, by the sensor device, one or more packets, each packet of the one or more packets including a section of the spectrum data as a corresponding payload for said each packet of the one or more packets; and sending, by the sensor device, the one or more packets to the computer device through the serial communication link.

7. A system comprising:
a computer device;
a sensor device configured to be in communication with the computer device, the sensor device comprises a processor and a sensor embedded on a same printed circuit board, wherein the sensor device is located on a location of a machine such that the sensor and the processor are located on the location of the machine;
a serial communication link between the computer device and the sensor device;
the sensor of the sensor device being configured to:
detect acceleration forces caused by a vibration being experienced at the location of the machine;
the processor of the sensor device being configured to:
transform the acceleration forces into sensor data represented in a time domain;
transform the sensor data represented in the time domain into spectrum data represented in a frequency domain;
execute a spectrum analysis on the spectrum data;
generate a packet that comprises a result of the spectrum analysis as a payload of the packet, wherein a format of the packet is based on a protocol of the serial communication link; and
send the packet that comprises the result of the spectrum analysis to the computer device through the serial communication link;
the computer device being configured to:
identify a frequency that corresponds to a frequency bin with a largest amplitude among the spectrum data; and
operate a tuned mass damper based on the identified frequency.

8. The system of claim 7, wherein the serial communication link is a controller area network (CAN) bus.

9. The system of claim 7 further comprises a plurality of sensor devices configured to be in communication with the computer device through the serial communication link, wherein the sensor device is among the plurality of sensor devices, and the plurality of sensor devices are located at one or more locations of the machine that comprises the computer device.

10. The system of claim 7, wherein the computer device is configured to:
send one or more application parameters associated with an application to the sensor device, wherein the spectrum analysis is based on the one or more application parameters; receive the packet;
read the result of the spectrum analysis from the payload of the packet; and
operate the machine with use of the result of the spectrum analysis.

11. The system of claim 7, wherein the sensor device is further configured to:
sample the sensor data represented in the time domain at a sampling rate to generate sampled data; and
transform the sampled data into the spectrum data.

12. The system of claim 11, wherein the sensor device is further configured to sample the sensor data represented in the time domain at a different sampling rate to adjust a frequency resolution of the spectrum data.

13. The system of claim 11, wherein the sensor device is further configured to receive one or more application parameters, wherein the sampling rate is based on the received one or more application parameters.

14. The system of claim 13, wherein the sensor device is further configured to:
partition the spectrum data into one or more sections based on the received one or more application parameters;
generate one or more packets, each packet of the one or more packets including a section of the spectrum data as a corresponding payload for said each packet of the one or more packets; and
send the one or more packets to the computer device through the serial communication link.

15. The system of claim 14, wherein the computer device is configured to:
receive the one or more packets that comprises the one or more sections.

16. A device comprising:
an accelerometer;
a memory device;
a processor configured to be in communication with the accelerometer and the memory device, wherein the accelerometer, the memory device, and the processor are embedded on a same printed circuit board within a same enclosure located on a location of a machine such that the accelerometer, the memory device, and the processor are located on the location of the machine;
the accelerometer being configured to:
detect acceleration forces caused by a vibration being experienced at the location of the machine;
transform the acceleration forces of the vibration into sensor data represented in a time domain;
send the sensor data to the processor;
the processor being configured to:
transform the sensor data represented in the time domain into spectrum data represented in a frequency domain;
execute a spectrum analysis on the spectrum data;
generate a packet that comprises a result of the spectrum analysis as a payload of the packet, wherein a format of the packet is based on a protocol of a serial communication link between the device and a computer device; and
send the packet comprising the result of the spectrum analysis to the computer device through the serial communication link, wherein a frequency that corresponds to a frequency bin with a largest amplitude among the spectrum data is identified for operating a tuned mass damper.

17. The device of claim 16, wherein the processor is further configured to:
sample the sensor data represented in the time domain at a sampling rate to generate sampled data; and
transform the sampled data into the spectrum data.

18. The device of claim 17, wherein the processor is further configured to sample the sensor data represented in the time domain at a different sampling rate to adjust a frequency resolution of the spectrum data.

19. The device of claim 17, wherein the processor is further configured to receive one or more application parameters, wherein the sampling rate is based on the received one or more application parameters.

20. The device of claim 19, wherein the processor is further configured to:
partition the spectrum data into one or more sections based on one or more application parameters;

generate one or more packets, each packet of the one or more packets including a section of the spectrum data as a corresponding payload for said each packet of the one or more packets; and send the one or more packets to the computer device through the serial communication link.

* * * * *